(12) United States Patent
Gianesello

(10) Patent No.: US 11,128,057 B2  
(45) Date of Patent: Sep. 21, 2021

(54) WIRELESS CONNECTOR

(71) Applicant: STMICROELECTRONICS SA, Montrouge (FR)

(72) Inventor: Frederic Gianesello, Saint Alban Leysse (FR)

(73) Assignee: STMicroelectronics SA, Montrouge (FR)

(*) Notice: Subject to any disclaimer, the term of this patent is extended or adjusted under 35 U.S.C. 154(b) by 0 days.

(21) Appl. No.: 16/296,022

(22) Filed: Mar. 7, 2019

(65) Prior Publication Data

US 2019/0280393 A1   Sep. 12, 2019

(30) Foreign Application Priority Data

Mar. 8, 2018 (FR) .................................... 1852020

(51) Int. Cl.
| | |
|---|---|
| H01Q 21/06 | (2006.01) |
| H01Q 21/24 | (2006.01) |
| H01Q 13/02 | (2006.01) |
| H04B 5/00 | (2006.01) |
| H01P 5/02 | (2006.01) |
| H01Q 21/08 | (2006.01) |
| H01Q 21/28 | (2006.01) |
| H01Q 1/52 | (2006.01) |

(52) U.S. Cl.
CPC ........... H01Q 21/064 (2013.01); H01P 5/024 (2013.01); H01Q 1/523 (2013.01); H01Q 13/02 (2013.01); H01Q 21/08 (2013.01); H01Q 21/24 (2013.01); H01Q 21/28 (2013.01); H04B 5/005 (2013.01); H04B 5/0031 (2013.01)

(58) Field of Classification Search
CPC .... H01Q 21/08; H01Q 21/24; H01Q 21/0056; H01Q 13/085; H10Q 3/10
See application file for complete search history.

(56) References Cited

U.S. PATENT DOCUMENTS

| | | | |
|---|---|---|---|
| 2012/0169552 A1* | 7/2012 | Lee .................... | H01Q 9/285 343/727 |
| 2012/0290760 A1 | 11/2012 | McCormack et al. | |
| 2013/0063159 A1* | 3/2013 | Koyama ............... | B82Y 20/00 324/639 |
| 2014/0044043 A1* | 2/2014 | Moshfeghi ........... | H04B 7/0617 370/328 |
| 2015/0147978 A1* | 5/2015 | Davis .................... | G06F 1/1632 455/73 |
| 2015/0264515 A1 | 9/2015 | Uchida | |
| 2017/0195054 A1 | 7/2017 | Ashrafi | |
| 2017/0338566 A1* | 11/2017 | Shiba .................... | H01Q 19/08 |

FOREIGN PATENT DOCUMENTS

WO     2014/116420 A1    7/2014

* cited by examiner

*Primary Examiner* — Seokjin Kim  
(74) *Attorney, Agent, or Firm* — Seed IP Law Group LLP

(57) ABSTRACT

A connector includes a first antenna configured to transmit first signals in a first direction and with a first polarization, a second antenna coupled to the first antenna and configured to transmit second signals in a second direction that is parallel to the first direction and with a second polarization that is orthogonal to the first polarization, and a third antenna coupled to the first and second antennas and configured to transmit third signals in a third direction that is parallel to the first direction and with the first polarization, wherein the second antenna is positioned between the first and third antennas.

20 Claims, 2 Drawing Sheets

WIRELESS CONNECTOR

BACKGROUND

Technical Field

The present disclosure relates to a connector and more particularly to a wireless connector.

Description of the Related Art

Wireless connectors are more and more used to transmit power and data between mobile electronic devices such as cell phones, tablets, laptop computers, etc.

Wireless connectors are generally formed of antennas transmitting/receiving signals at various frequencies.

BRIEF SUMMARY

Thus, an embodiment provides a connector comprising at least three antennas capable of transmitting in parallel with alternated orthogonal polarizations.

According to an embodiment, at least one first antenna is vertically polarized and at least one second antenna is horizontally polarized.

According to an embodiment, the antennas of same polarization are spaced apart by a distance greater than a distance at which the attenuation between the two signals that they transmit is limited to a threshold.

According to an embodiment, the threshold is of a few tens of dB.

According to an embodiment, the threshold is lower than 30 dB.

According to an embodiment, the threshold is approximately 28 dB, preferably 28 dB.

According to an embodiment, the threshold is approximately 15 dB, preferably 15 dB.

According to an embodiment, the antennas are aligned along a direction orthogonal to the main directions of the signals that they transmit.

According to an embodiment, the antennas have a transmit/receive frequency in the range from approximately 57 GHz and 66 GHz, preferably from 57 GHz to 66 GHz.

According to an embodiment, the antennas have a transmit/receive frequency of approximately 60 GHz, preferably 60 GHz.

According to an embodiment, the antennas are waveguide antennas.

According to an embodiment, the antennas are horn antennas.

According to an embodiment, the antennas are antennas with a pyramidal horn.

According to an embodiment, the antennas are antennas with a horn flared along a single direction.

An embodiment provides a system comprising two connectors such as described.

The foregoing and other features and advantages will be discussed in detail in the following non-limiting description of specific embodiments in connection with the accompanying drawings.

DETAILED DESCRIPTION

Figure 1:
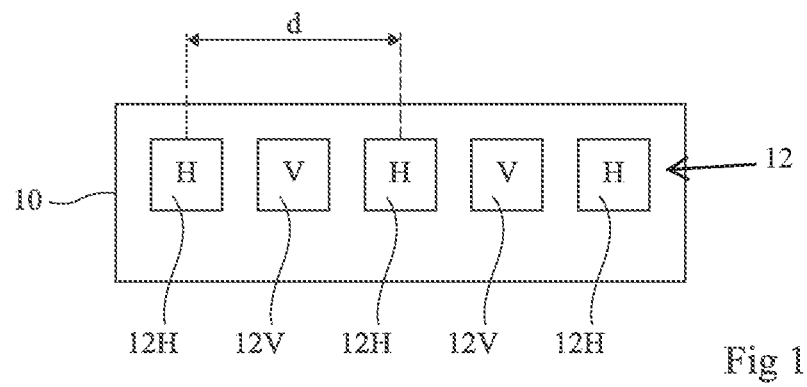
FIG. 1 is a simplified view of an embodiment of a wireless connector.

The same elements have been designated with the same reference numerals in the different drawings. For clarity, only those steps and elements which are useful to the understanding of the described embodiments have been shown and are detailed. In particular, the transmit and receive circuits will not be detailed, the described embodiments being compatible with usual transmit and receive circuits.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred to the orientation of the drawings. The terms "approximately", "about", and "substantially" are used herein to designate a tolerance of plus or minus 10%, preferably of plus or minus 5%, of the value in question.

In the following description, a vertically polarized antenna is an antenna capable of transmitting and or receiving vertically polarized signals. Similarly, a horizontally polarized antenna is an antenna capable of transmitting and or receiving horizontally polarized signals.

Using a plurality of identical antennas in parallel in a wireless connector is known to increase the data flow transmitted by the connector. A disadvantage of this type of connector is that the antennas should be sufficiently spaced apart for the signals that they transmit not to interfere too much with one another.

FIG. 1 schematically illustrates an embodiment of a wireless connector 10 comprising a plurality of antennas 12 in parallel and signal transmission, reception, and processing circuits (not shown in FIG. 1).

Connector 10 comprises at least 3 antennas and may comprise up to several tens, or even hundreds, of antennas 12 (five only are shown in FIG. 1). Antennas 12 are positioned to transmit signals in parallel. As an example, antennas 12 are for example aligned along a direction orthogonal to the main direction of the transmitted signals. Antennas 12 are either antennas configured to transmit and receive vertically polarized signals, noted antenna 12V, or antennas configured to transmit and receive horizontally polarized signals, noted antenna 12H. In connector 10, antennas 12H and 12V are alternated, that is, two antennas of the same polarization type are separated by an antenna of the other polarization type. Each pair of two neighboring antennas of same polarization (12H or 12V) is separated by a distance d. The assembly of antennas 12 indifferently starts and ends with an antenna 12V or an antenna 12H. As an example, in connector 10, antennas 12 are regularly spaced apart.

Antennas 12 are waveguide antennas, for example, horn antennas. Different types of horn antennas will be described in relation with FIGS. 3A and 3B. Antennas 12 transmit and receive signals having a frequency for example in the range from approximately 57 and approximately 66 GHz, preferably in the order of 60 GHz.

An advantage of the embodiment of FIG. 1 is that signals having orthogonal polarizations do not attenuate each other. Thus, only the distance between two antennas of same polarization is limited by the attenuation of the signals that they transmit. Such an embodiment thus enables to have a larger number of antennas in a connector as compared with a connector only comprising antennas of same polarization. The determination of distance d between two antennas of same polarization will be explained in relation with FIG. 2.

Figure 2:
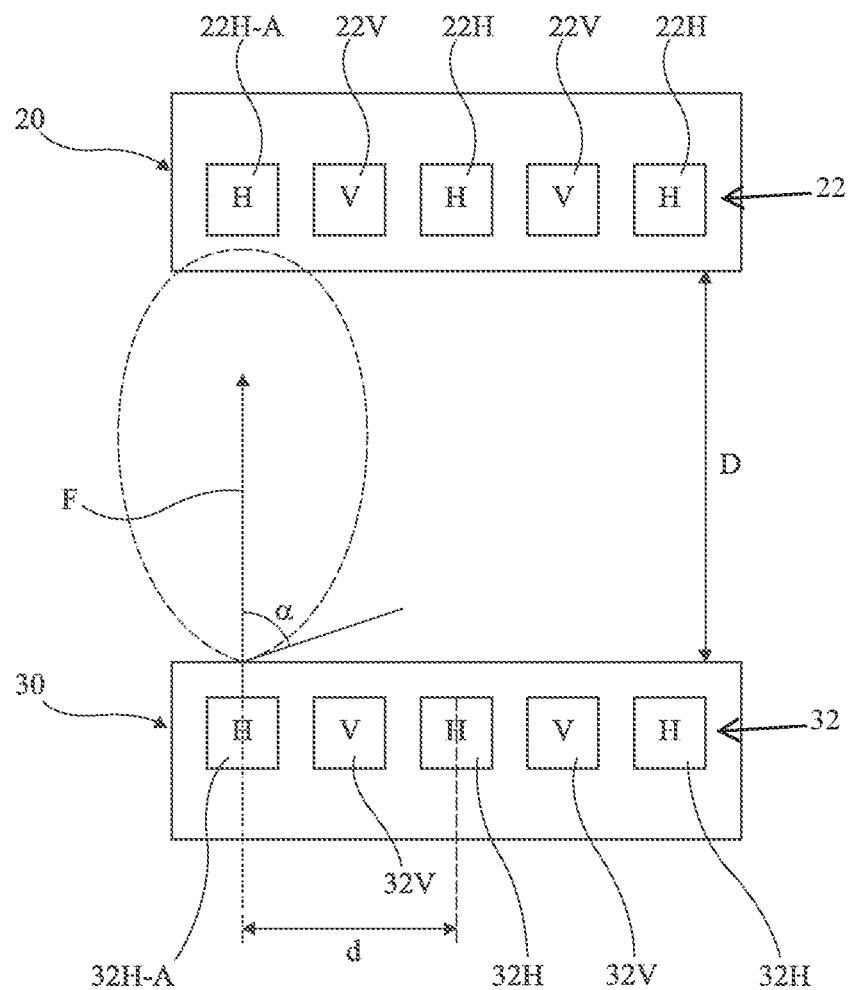
FIG. 2 is a simplified view of a system comprising two connectors of FIG. 1.

FIG. 2 is a simplified view of a system comprising two wireless connectors 20 and 30 of the type in FIG. 1 arranged parallel and opposite each other, spaced apart by a distance D. Thus, connector 20, respectively 30, comprises antennas 22 (22V and 22H), respectively 32 (32V and 32H). In the example illustrated in FIG. 2, connector 30 transmits a signal via its antennas 32 and connector 20 receives said signal via its antennas 22. Each antenna 32 of connector 30 is paired with an antenna 22 of connector 20 arranged opposite thereto.

An application of connectors 20 and 30 is a short distance data transfer. More particularly, the data transfer for a distance D in the order of a few wavelengths of the transmitted signals, for example, smaller than 10 wavelengths.

An antenna 32 transmits a signal along a direction orthogonal to connector 30, symbolized by an arrow F. However, such a signal it not transmitted along a single direction but according to a transmission cone having its aperture defined by an angle α. An example of such a transmission cone is shown in dotted lines in FIG. 2. The cone represents the signal transmitted by an antenna 32H-A of connector 30 and received by an antenna 22H-A of connector 20, paired with antenna 22H-A. To have an efficient data transfer between connectors 30 and 20, a signal transmitted by an antenna 32 should only be received by antenna 22 paired with antenna 32. In practice, the signal transmitted by antenna 32 is also received by the other antennas but in attenuated fashion according to angle of aperture a. The smaller angle α, the more the signal transmitted towards the other antennas of same polarization (different from the paired antenna) is attenuated. Thus, the larger the distance between antennas 22 of same type, the more the signal transmitted by antenna 32 is received in attenuated fashion by the antennas 22 close to antenna 22. To define the minimum distance between two antennas of the same type, an attenuation threshold of the "parasitic" signals not to be exceeded is defined. The attenuation threshold is for example in the order of a few tens of dB, for example, smaller than 30 dB. According to an embodiment, the threshold is approximately 28 dB, preferably 28 dB. According to an embodiment, the threshold is approximately 15 dB, preferably 15 dB.

According to an embodiment, for signals having a frequency in the range from approximately 57 GHz to approximately 66 GHz, for example, in the order of 60 GHz, distance D is for example in the order of a few centimeters. In this case, to keep an attenuation in the order of 28 dB, distance d between two antennas of same polarization is in the order of 14 mm.

Figure 3A:
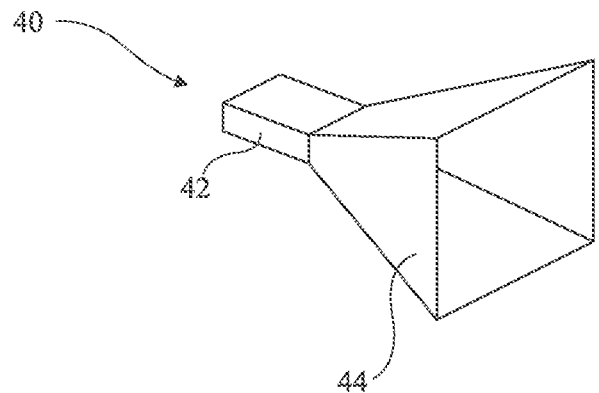
FIGS. 3A and 3B are perspective views illustrating examples of an antenna horn.
Figure 3B:
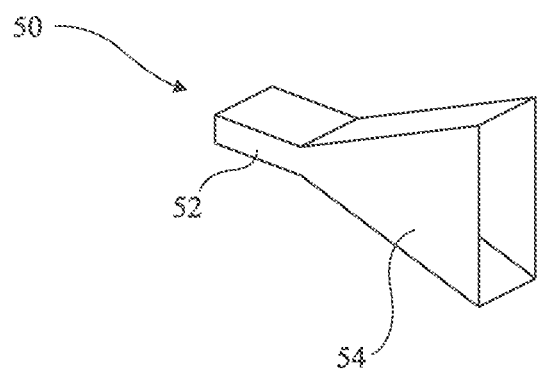

FIGS. 3A and 3B are perspective views of examples of a horn used in horn antennas.

FIG. 3A is a perspective view of a pyramidal horn 40 of a horn antenna.

Horn 40 is formed of a waveguide 42 having a rectangular cross-section and a flared portion 44. One of the ends of waveguide 42 is coupled to an end of flared portion 44. Flared portion 44 has the shape of a pyramid with four sides, of rectangular transverse cross-section.

This type of horn is used to transmit horizontally or vertically linearly polarized waves.

FIG. 3B is a perspective view of a horn 50 flared in a single dimension, in the present case, in plane E.

Horn 50 is formed of a waveguide 52 having a rectangular cross-section and a flared portion 54. One of the ends of waveguide 52 is coupled to an end of flared portion 54. Portion 54 comprises four surfaces, two of which are parallel to each other. Portion 54 has a rectangular transverse cross-section and a trapezoidal longitudinal cross-section. The parallel surfaces of portion 54 are for example along the direction of the electric field or along the direction of the magnetic field.

This type of horn is used to transmit horizontally or vertically linearly polarized waves.

Other types of antennas may be used in connector 10.

Various embodiments with different variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A connector, comprising:
a first antenna including a transmission cone, the first antenna configured to transmit first signals via the transmission cone in a first direction and with a first polarization, the transmission cone having an aperture defined by a first angle;
a second antenna coupled to the first antenna and configured to transmit second signals in a second direction that is parallel to the first direction and with a second polarization that is orthogonal to the first polarization; and
a third antenna coupled to the first and second antennas and configured to transmit third signals in a third direction that is parallel to the first direction and with the first polarization, wherein the second antenna is positioned between the first and third antennas,
wherein the connector has a data transfer distance of less than 10 wavelengths, and the first and third antennas are spaced apart by a first distance greater than a distance at which an attenuation between the first and third signals is limited to an attenuation threshold of no more than a few tens of decibels (dB), and
wherein the attenuation threshold is based on the first angle of the aperture and the first distance between the first antenna and the third antenna.

2. The connector of claim 1, wherein at least one of the first, second and third antennas is vertically polarized and at least one of the first, second and third antennas is horizontally polarized.

3. The connector of claim 1, wherein the threshold is smaller than 30 dB.

4. The connector of claim 1, wherein the threshold is approximately 28 dB.

5. The connector of claim 1, wherein the threshold is approximately 15 dB.

6. The connector of claim 1, wherein the first, second, and third antennas are aligned along a direction orthogonal to the first, second, and third directions.

7. The connector of claim 1, wherein the antennas have a transmit/receive frequency in the range from approximately 57 GHz to approximately 66 GHz.

8. The connector of claim 7, wherein the antennas have a transmit/receive frequency in an order of 60 GHz.

9. The connector of claim 1, wherein the antennas are waveguide antennas.

10. The connector of claim 9, wherein the antennas are horn antennas.

11. The connector of claim 10, wherein the antennas are antennas with a pyramidal horn.

12. The connector of claim 10, wherein the antennas are antennas with a horn flared along a first dimension and unflared along a second dimension orthogonal to the first dimension.

13. A system comprising:
a first connector including:
a first antenna including a transmission cone, the first antenna configured to transmit first signals via the transmission cone in a first direction and with a first polarization, the transmission cone having an aperture defined by a first angle;
a second antenna coupled to the first antenna and configured to transmit second signals in a second direction that is parallel to the first direction and with a second polarization that is orthogonal to the first polarization; and
a third antenna coupled to the first and second antennas and configured to transmit third signals in a third direction that is parallel to the first direction and with the first polarization, wherein the second antenna is positioned between the first and third antennas; and
a second connector including:
a fourth antenna configured to transmit fourth signals in a fourth direction and with the first polarization, the fourth direction being toward the first antenna and the first direction being toward the fourth antenna;
a fifth antenna coupled to the fourth antenna and configured to transmit fifth signals in a fifth direction that is parallel to the fourth direction and with the second polarization, the fifth direction being toward the second antenna and the second direction being toward the fifth antenna; and
a sixth antenna coupled to the fourth and fifth antennas and configured to transmit sixth signals in a sixth direction that is parallel to the fourth direction and with the first polarization, the sixth direction being toward the third antenna and the third direction being toward the sixth antenna, wherein the fifth antenna is positioned between the fourth and sixth antennas,
wherein the first connector and the second connector are arranged substantially parallel to each other and the first connector and the second connector are spaced apart at a first distance,
wherein a data transfer for the first distance between the first connector and the second connector is less than 10 wavelengths, and the first and third antennas are spaced apart by a second distance greater than the first distance at which an attenuation threshold between the first and third signals is limited to a threshold of no more than a few tens of decibels (dB), and
wherein the attenuation threshold is based on the first angle of the aperture, the first distance between the first connector and the second connector, and the second distance between the first antenna and the third antenna.

14. The system of claim 13, wherein at least one of the first, second and third antennas is vertically polarized and at least one of the first, second and third antennas is horizontally polarized.

15. The system of claim 13, wherein the threshold is approximately 15 dB.

16. The system of claim 13, wherein the first, second, and third antennas are aligned along a direction orthogonal to the first, second, and third directions.

17. The system of claim 13, wherein the antennas have a transmit/receive frequency in the range from approximately 57 GHz to approximately 66 GHz.

18. The system of claim 13, wherein the antennas are antennas with a horn flared along a first dimension and unflared along a second dimension orthogonal to the first dimension.

19. The system of claim 13, wherein the threshold is approximately 28 dB, and the first and third antennas are spaced apart by about 14 mm.

20. The connector of claim 1, wherein the threshold is approximately 28 dB, and the first and third antennas are spaced apart by about 14 mm.

* * * * *